United States Patent
Zehavi et al.

(10) Patent No.: US 9,699,659 B2
(45) Date of Patent: Jul. 4, 2017

(54) ON-BOARDING A DEVICE TO A SECURE LOCAL NETWORK

(71) Applicant: QUALCOMM Incorporated, San Diego, CA (US)

(72) Inventors: Doron Zehavi, Kibbutz Tzora (IL); Lior Amarilio, Yokneam (IL); Zeev Shusterman, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 14/803,461

(22) Filed: Jul. 20, 2015

(65) Prior Publication Data
US 2016/0036819 A1    Feb. 4, 2016

Related U.S. Application Data

(60) Provisional application No. 62/031,606, filed on Jul. 31, 2014.

(51) Int. Cl.
G06F 7/04    (2006.01)
H04W 12/08    (2009.01)
(Continued)

(52) U.S. Cl.
CPC .......... *H04W 12/08* (2013.01); *G06F 9/4411* (2013.01); *H04L 67/12* (2013.01); *H04W 4/005* (2013.01);
(Continued)

(58) Field of Classification Search
CPC .... H04L 63/10; H04L 12/2803; H04W 12/06; H04W 12/08; H04W 4/005
(Continued)

(56) References Cited

U.S. PATENT DOCUMENTS 8,196,064 B2    6/2012    Krzyzanowski et al.
8,280,009 B2    10/2012    Stepanian
(Continued)

FOREIGN PATENT DOCUMENTS

WO    2014094849 A1    6/2014

OTHER PUBLICATIONS

International Search Report and Written Opinion—PCT/US2015/041542—ISA/EPO—Oct. 23, 2015.
(Continued)

*Primary Examiner* — Samson Lemma
(74) *Attorney, Agent, or Firm* — Muncy, Geissler, Olds & Lowe, P.C.

(57) ABSTRACT

In an embodiment, a control device that is configured to onboard a target device to a secure local network by discovering a set of devices over a bootstrapping interface, establishing a bootstrap connection to at least one device from the set of devices in response to the discovery without authorizing the at least one device to access the secure local network, instructing the at least one device via the bootstrap connection to activate an observable function that is configured to be observable to one or more observation entities that are separate from the control device and are in proximity to the at least one device, determining whether an operator of the control device verifies that the observable function has been successfully detected as performed by the target device and selectively authorizing the at least one device to access the secure local network based on the determination.

24 Claims, 13 Drawing Sheets

(51) Int. Cl.
*G06F 9/44* (2006.01)
*H04W 48/04* (2009.01)
*H04W 12/06* (2009.01)
*H04W 4/00* (2009.01)
*H04L 29/08* (2006.01)
*H04W 8/00* (2009.01)

(52) U.S. Cl.
CPC ............ *H04W 8/005* (2013.01); *H04W 12/06* (2013.01); *H04W 48/04* (2013.01)

(58) Field of Classification Search
USPC .......................................................... 726/4
See application file for complete search history.

(56) References Cited

U.S. PATENT DOCUMENTS

| | | | |
|---|---|---|---|
| 8,473,325 | B2 | 6/2013 | Barnhill, Jr. et al. |
| 8,515,389 | B2 | 8/2013 | Smetters et al. |
| 2004/0168081 | A1 | 8/2004 | Ladas et al. |
| 2004/0268122 | A1* | 12/2004 | Satarasinghe ....... H04L 63/0838 713/159 |
| 2006/0133319 | A1* | 6/2006 | Kant ...................... H04L 63/10 370/331 |
| 2008/0031192 | A1* | 2/2008 | Narashimha ............ H04L 12/66 370/331 |
| 2014/0082702 | A1 | 3/2014 | Supalla |
| 2015/0341845 | A1* | 11/2015 | Hedberg ............... H04W 12/08 370/329 |

OTHER PUBLICATIONS

Menezes, et al., "Handbook of Applied Cryptography", 1997, CRC Press LLC, USA, XP001525013, pp. 543-590, p. 543-p. 590.

* cited by examiner

ON-BOARDING A DEVICE TO A SECURE LOCAL NETWORK

CLAIM OF PRIORITY UNDER 35 U.S.C. §119

The present Application for Patent claims priority to Provisional Application No. 62/031,606, entitled "ON-BOARDING A DEVICE TO A SECURE LOCAL NETWORK", filed Jul. 31, 2014, by the same inventors as the subject application, assigned to the assignee hereof and hereby expressly incorporated by reference herein in its entirety.

TECHNICAL FIELD

Various embodiments described herein generally relate to on-boarding a device to a secure local network.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

Some on-boarding solutions for IoT networks require each prospective IoT device to announce itself to the IoT network via a service set identifier (SSID), whereby the SSID for the prospective IoT device appears in a list of WiFi hotspots on an operator's client device. The operator of the client device selects a device from the list of WiFi hotspots via its associated SSID, after which the client devices sends credentials for the IoT network to the selected device. The selected device then uses the IoT network credentials to join the IoT network. Conventionally, the SSID (or hotspot name) for a particular IoT device (e.g., a phone, an appliance such as a lamp or coffee maker, etc.) is preconfigured by a manufacturer of the associated IoT device. This introduces complexity to the on-boarding procedure when devices with the same device-type are present in proximity to the IoT network. For example, the operator's client device may detect eight (8) different lamps and show their associated SSIDs in the list of WiFi hotspots, and the operator may not be able to easily figure out how to correlate the respective lamps to their associated SSIDs in the list of WiFi hotspots.

SUMMARY

In an embodiment, a control device that is configured to onboard a target device to a secure local network by discovering a set of devices over a bootstrapping interface, establishing a bootstrap connection to at least one device from the set of devices in response to the discovery without authorizing the at least one device to access the secure local network, instructing the at least one device via the bootstrap connection to activate an observable function that is configured to be observable to one or more observation entities that are separate from the control device and are in proximity to the at least one device, determining whether an operator of the control device verifies that the observable function has been successfully detected as performed by the target device and selectively authorizing the at least one device to access the secure local network based on the determination.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
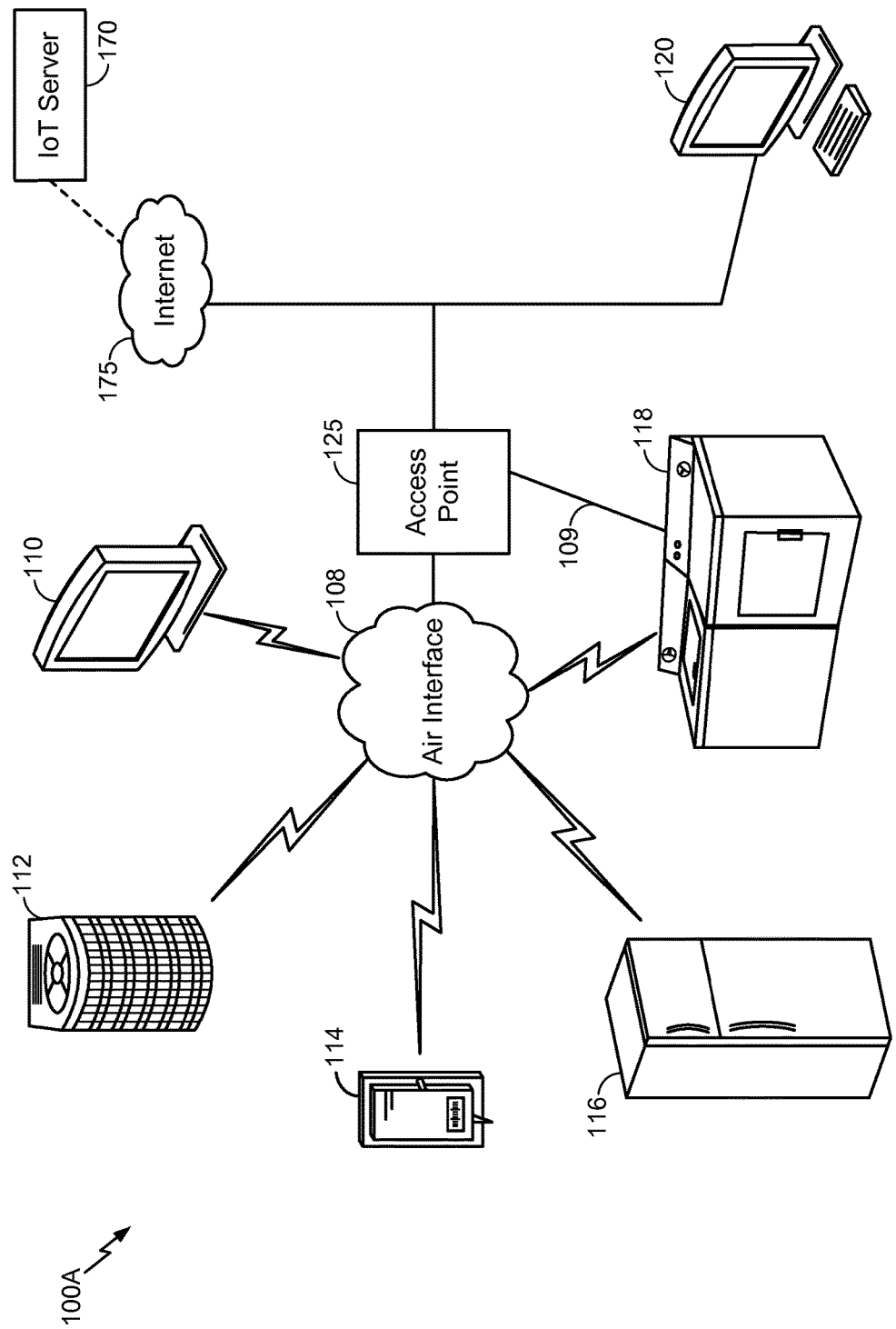
FIG. 1A illustrates a high-level system architecture of a wireless communications system in accordance with an aspect of the disclosure.

Various aspects are disclosed in the following description and related drawings to show specific examples relating to exemplary embodiments of on-boarding a device to a secure local network, such as an Internet of Things (IoT) network. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175.

The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
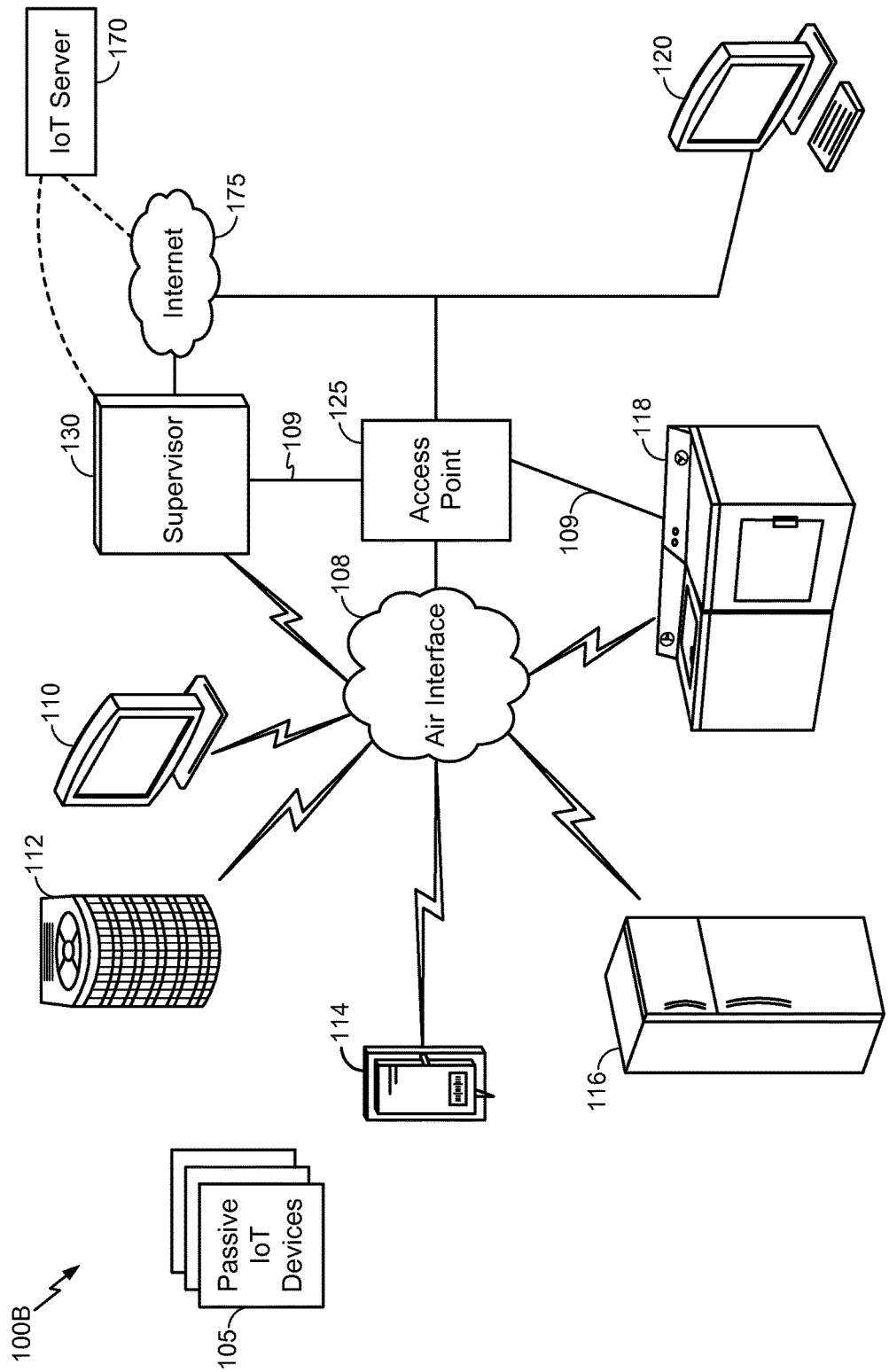
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
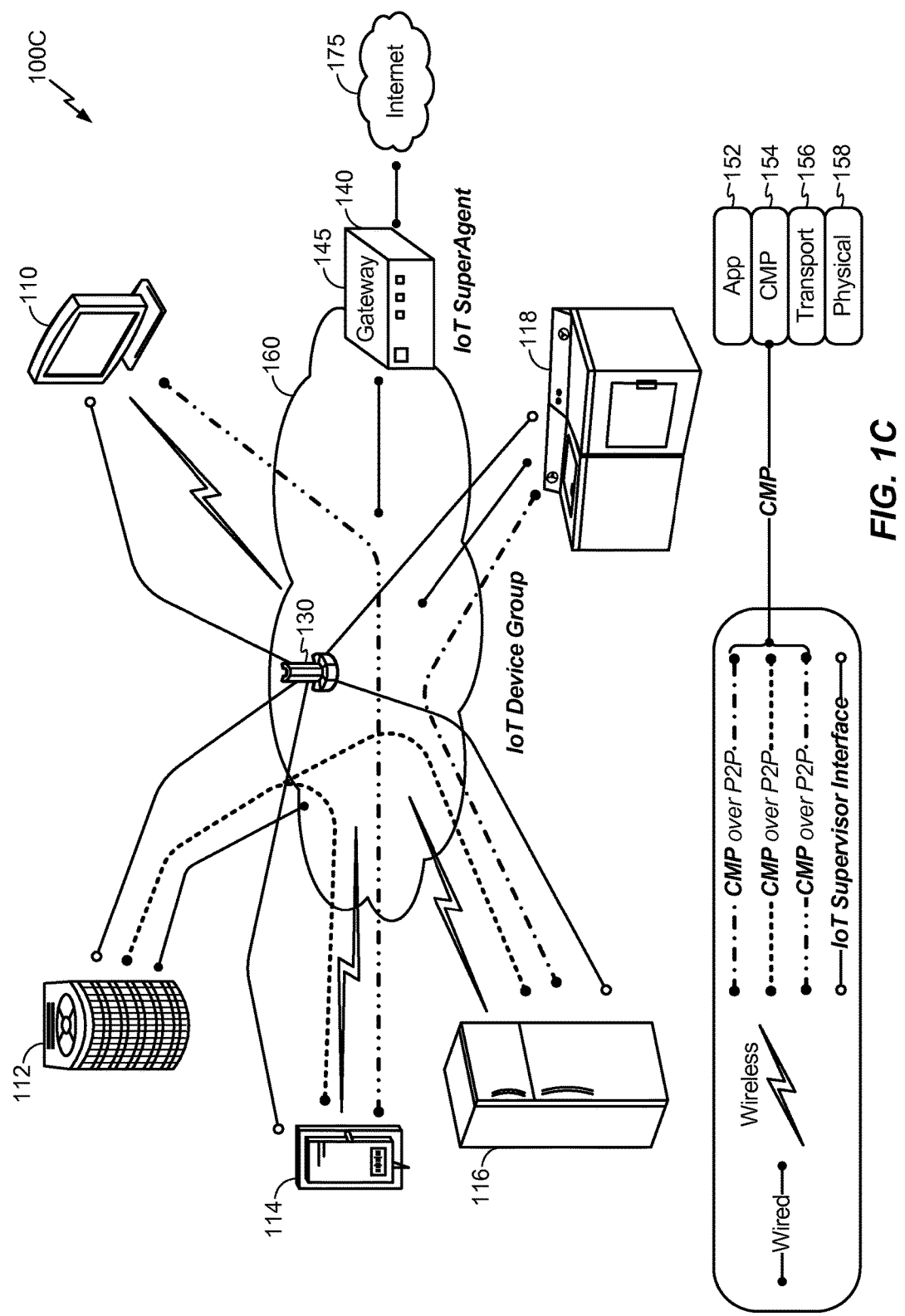
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
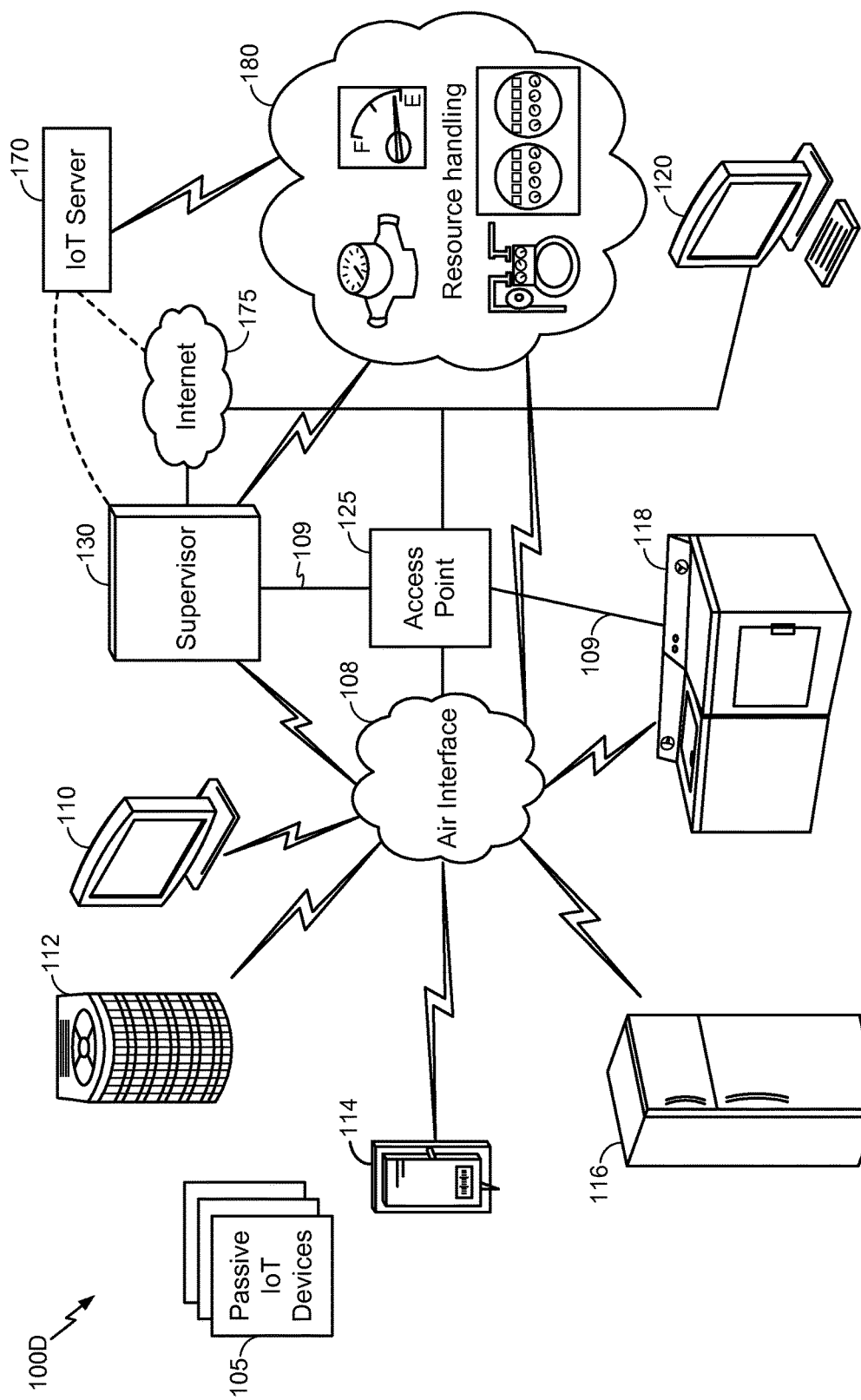
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1A-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
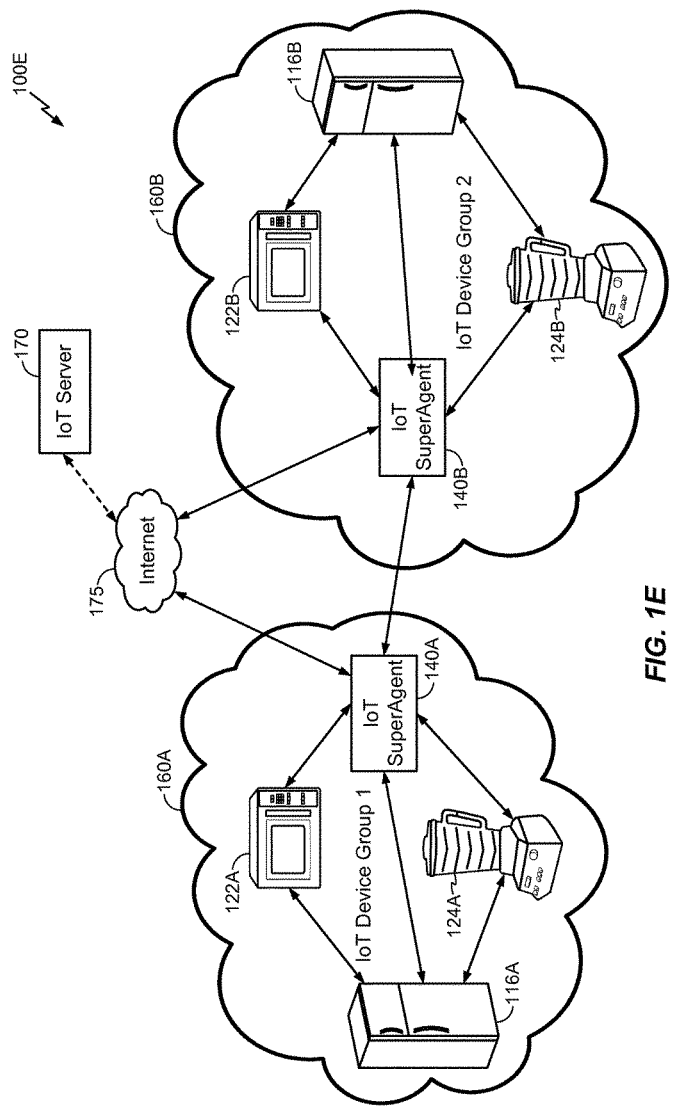
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1A-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT Super-Agents.

Figure 2A:
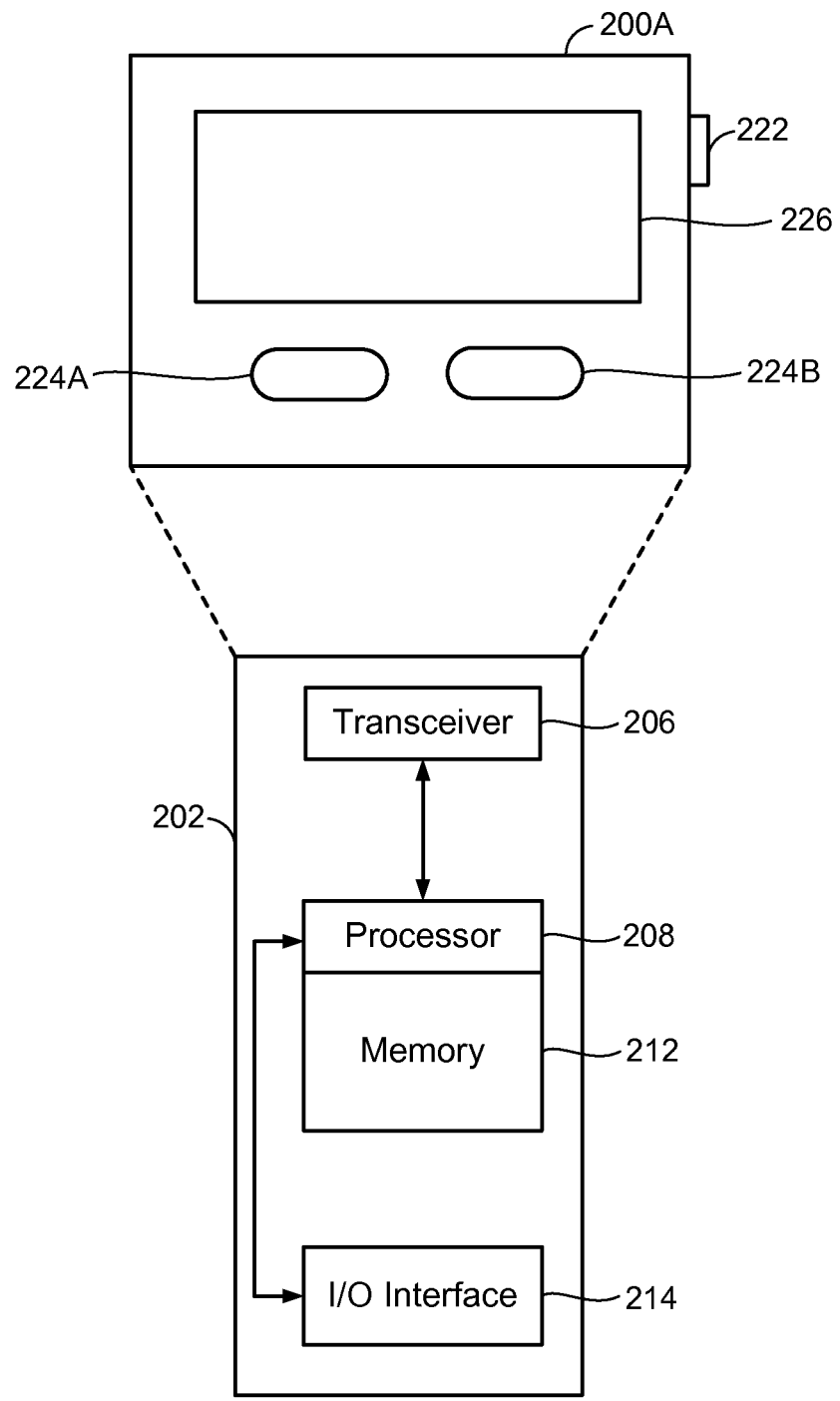

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
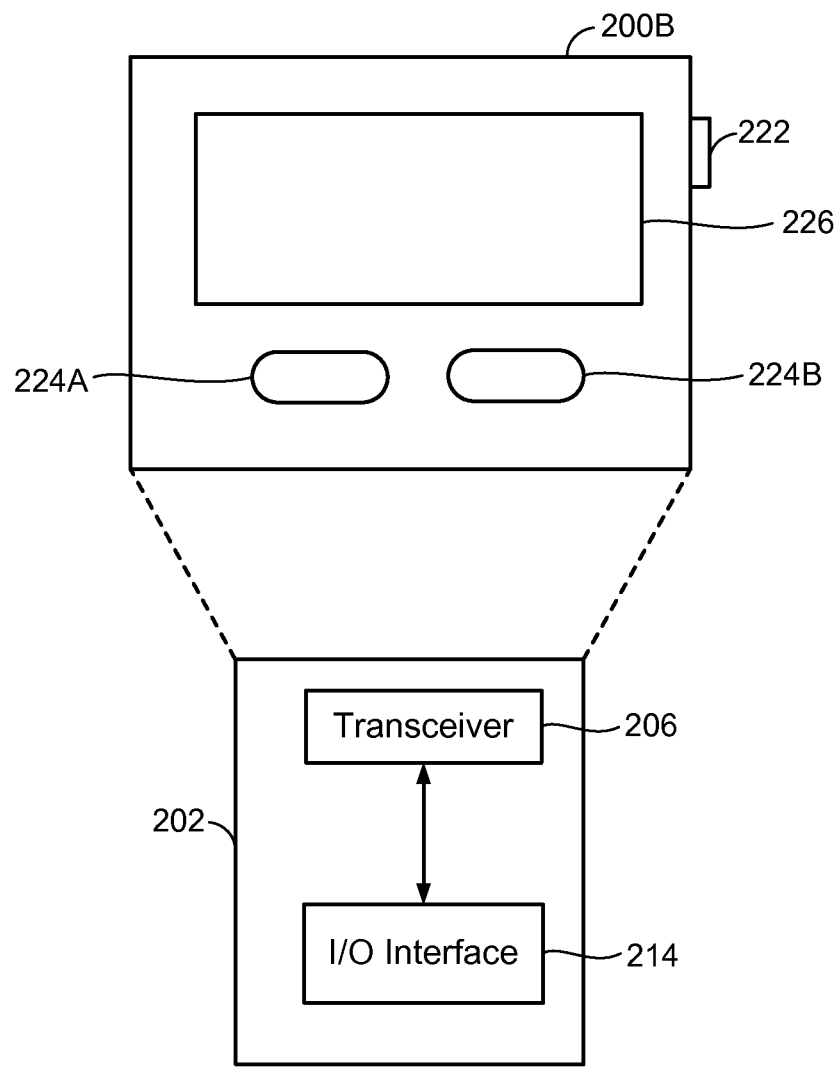
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
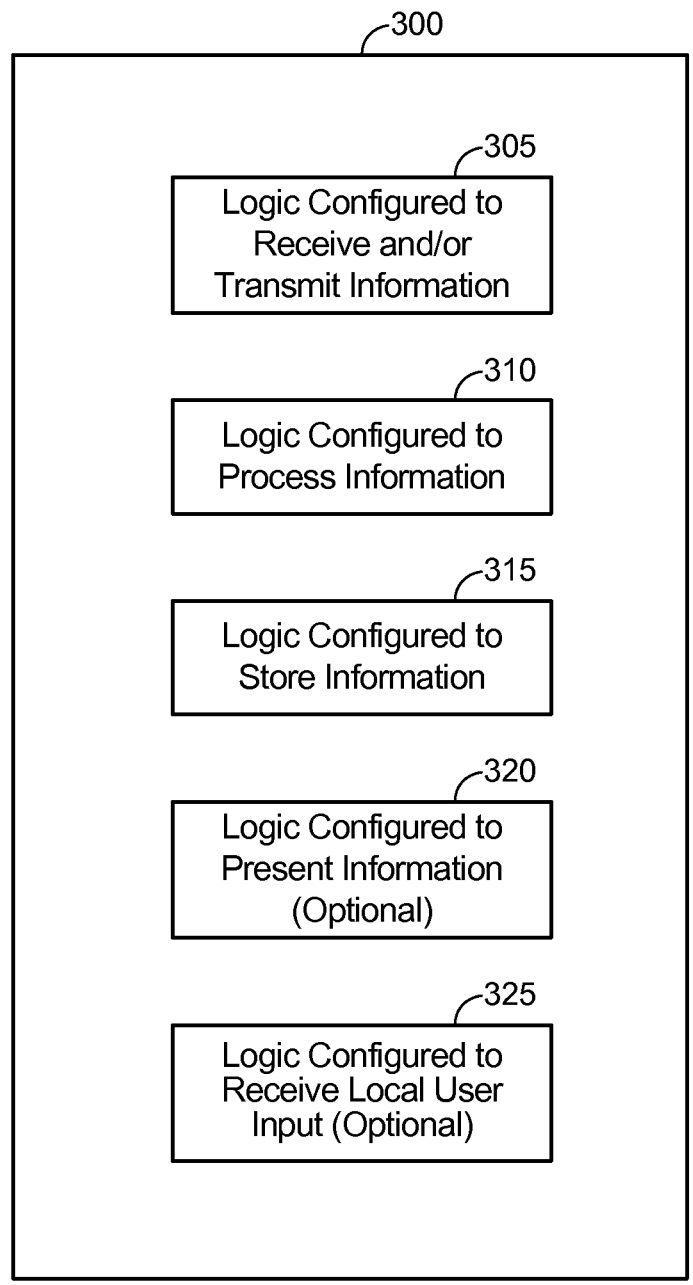
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
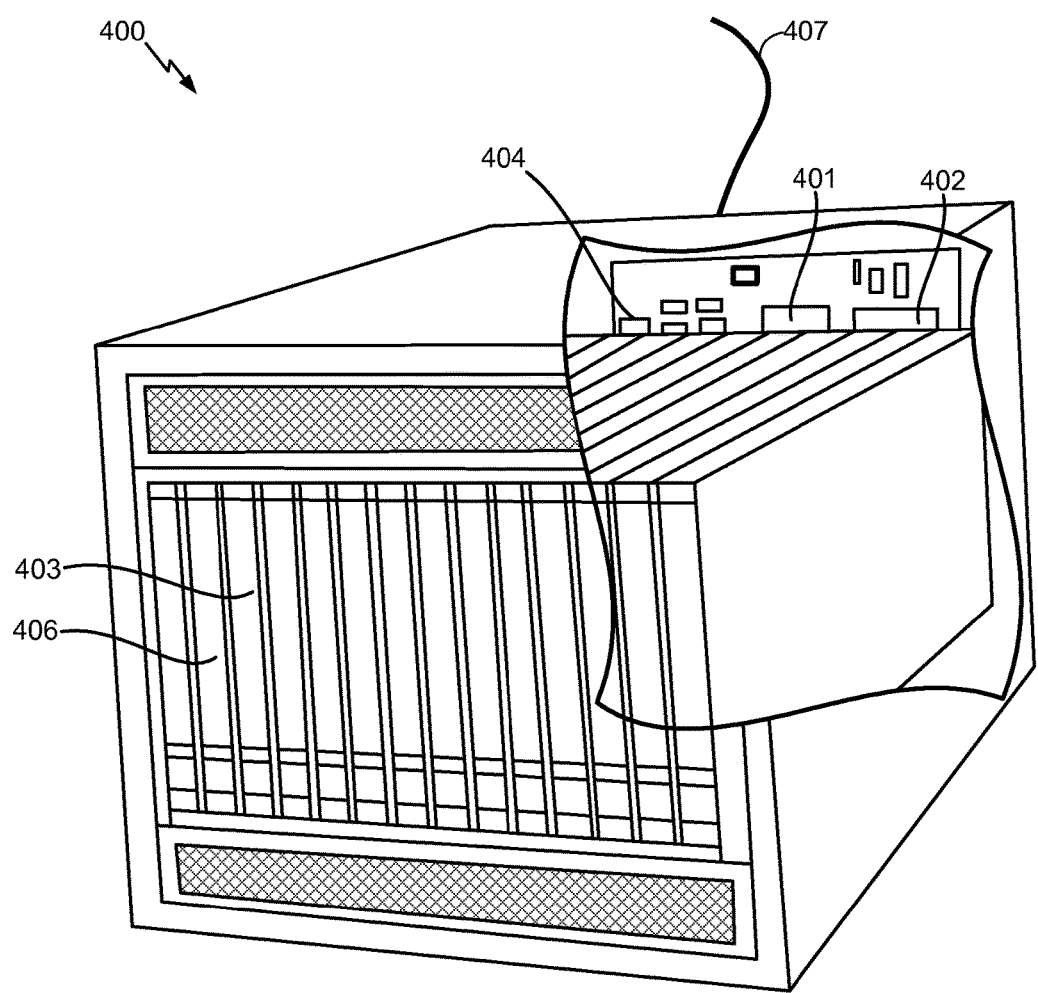
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

Figure 5:
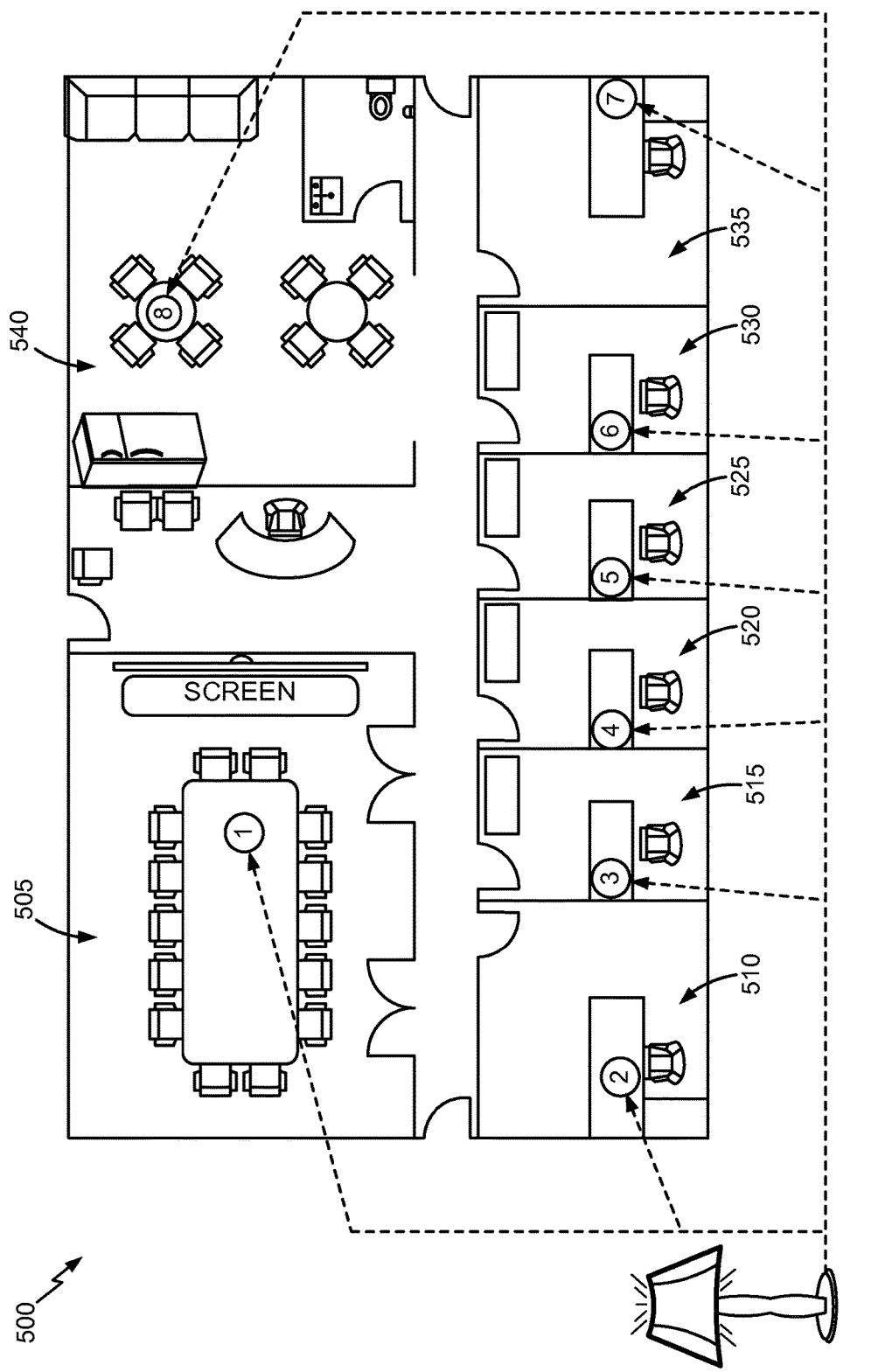
FIG. 5 illustrates an example of an IoT environment in accordance with an embodiment of the disclosure.

FIG. 5 illustrates an example of an IoT environment (or distributed IoT network) 500 in accordance with an embodiment of the disclosure. In FIG. 5, the IoT environment 500 is an office space with a conference room 505, a plurality of offices 510 through 535 and a kitchen 540. Within the office space, various IoT devices can be deployed (e.g., a refrigerator, a coffee machine, etc.). In particular, different IoT devices with the same device type can be deployed. For example, eight (8) different IoT "lamp" devices are shown as being deployed throughout the IoT environment 500 of FIG. 5, with IoT Lamp 1 being deployed in conference room 505, IoT Lamps 2 . . . 7 being deployed within offices 510 . . . 535, respectively, and IoT Lamp 8 being deployed in kitchen 540. As will be appreciated, while the IoT environment 500 of FIG. 5 is directed to an office, many other configurations of IoT environments are also possible (e.g., residential homes, retail stores, vehicles, stadiums, etc.).

Figure 6:
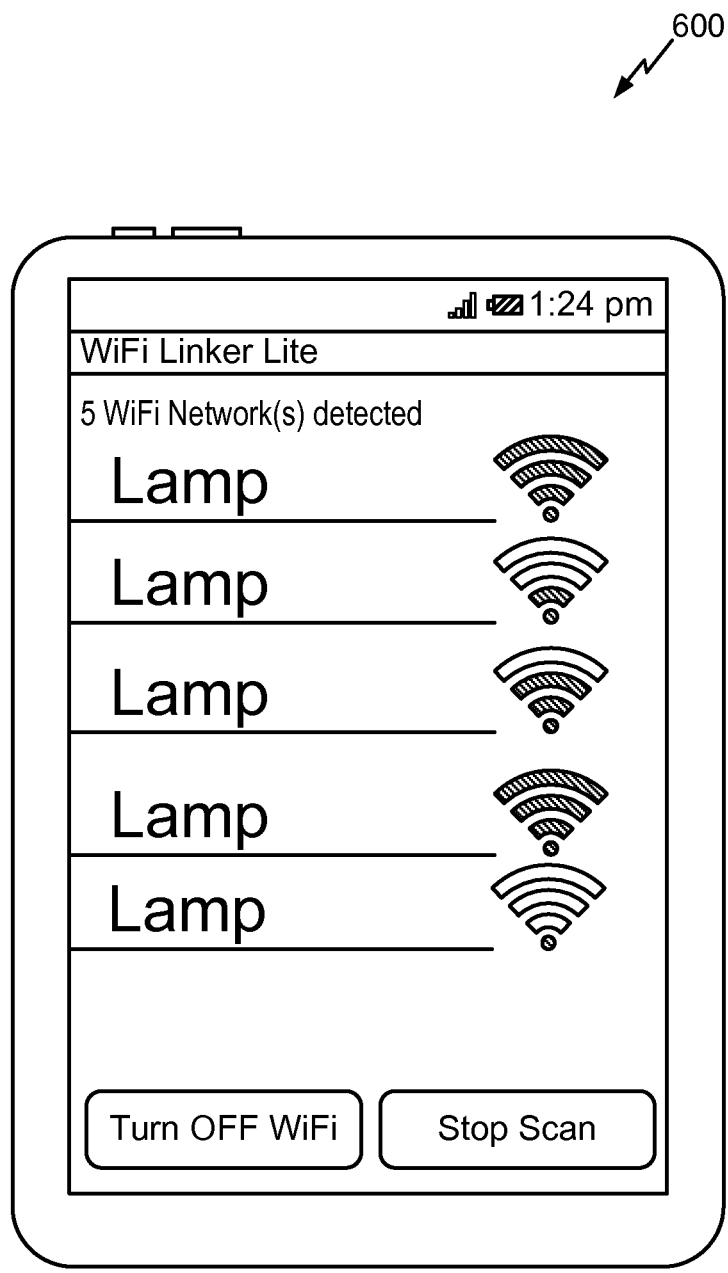
FIG. 6 illustrates an example of a selection screen that is based upon service set identifiers (SSIDs) detected for a set of IoT Lamps in accordance with an embodiment of the disclosure.

Some on-boarding solutions for IoT networks require each prospective IoT device to announce itself to the IoT network via a service set identifier (SSID), whereby the SSID for the prospective IoT device appears in a list of WiFi hotspots on a control device such as the supervisor device 130 discussed above. FIG. 6 illustrates an example of a selection screen 600 that is based upon SSIDs detected for a set of IoT Lamps, such as IoT Lamps 1 . . . 8 from FIG. 5. The operator of the control device can select a device from the list of WiFi hotspots via its associated SSID, after which the client devices sends a set of network credentials for the IoT network (e.g., a password, encryption information, frequency and/or channel information of an IoT communications interface upon which the IoT network operates, etc.) to the selected device. The selected device then uses the IoT network credentials to join the IoT network. Conventionally, the SSID (or hotspot name) for a particular IoT device (e.g., a phone, an appliance such as a lamp or coffee maker, etc.) can be preconfigured by a manufacturer of the associated IoT device. For example, as shown in FIG. 6, each of IoT Lamps 1 . . . 8 can be preconfigured with an SSID of "Lamp" that identifies each respective IoT device as having a "lamp" device-type without providing information by which the operator can easily differentiate between the respective IoT Lamps in the IoT environment 500. As will be appreciated, if the operator wants to on-board a specific lamp from the listed IoT Lamps to the IoT network, the operator may have difficulty figuring out which of the listed IoT Lamps is the correct IoT Lamp to be on-boarded.

Figure 7:
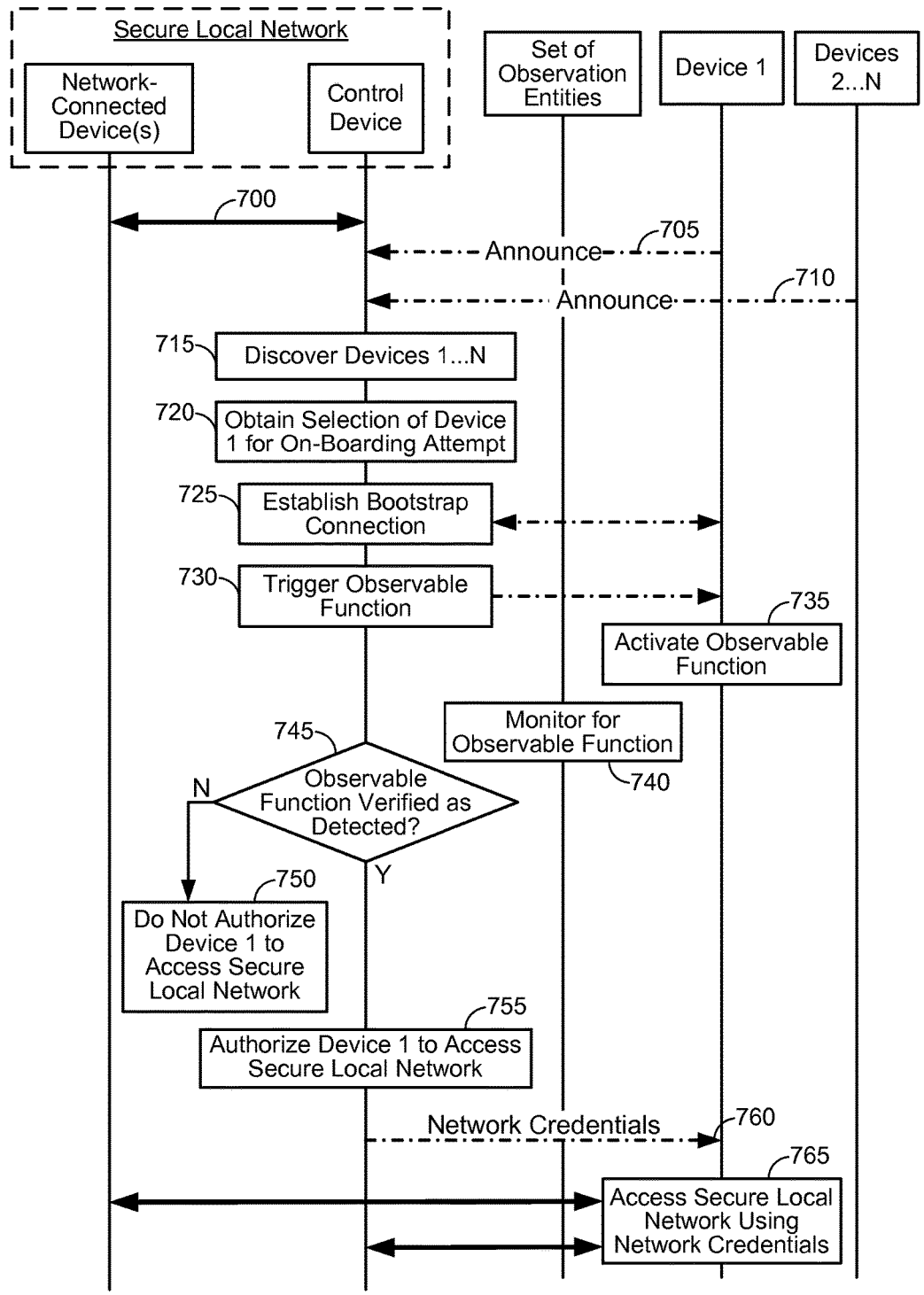
FIG. 7 illustrates a process of on-boarding a device to a secure local network in accordance with an embodiment of the disclosure.

FIG. 7 illustrates a process of on-boarding a device to a secure local network in accordance with an embodiment of the disclosure. In the embodiment of FIG. 7, the secure local network can correspond to an IoT network as described above, but it will be appreciated that the on-boarding procedure illustrated with respect to FIG. 7 can also be applied to non-IoT networks.

Referring to FIG. 7, assume that a group of network-connected devices already belong to the secure local network, whereby the group of network-connected devices includes one or more network-connected devices plus at least one control device that is configured to selectively authorize new devices to join the secure local network (i.e., on-boarding). The at least one control device can be implemented as the supervisor device 130 described above in an example. The secure local network permits communications to occur via a secure network interface with an associated interface type (e.g., WiFi, Bluetooth, infrared (IR), LTE Direct, WiFi Direct, etc.). In another embodiment, the one or more network-connected devices that are separate from the at least one control device can be considered optional in the case where a first device is being on-boarded to the secure local network. Below, reference is made to a single control device performing the on-boarding procedure in FIG. 7, although it will be appreciated that more than one control device could be used in other implementations. For example, an operator could on-board new devices to the secure local network using a handset device, a laptop computer or a tablet computer at different times, such that different control devices can be used to on-board devices to the same secure local network in an example.

At 700 of FIG. 7, data is exchanged between the group of network-connected devices over the secure network interface of the secure local network. At some point in time, devices 1 . . . N enter into proximity with the secure local network, and announce their presence via one or more announce messages over a bootstrapping interface, 705 and 710. For example, devices 1 . . . N can each broadcast their respective SSID. In the example whereby the devices 1 . . . N correspond to IoT Lamps 1 . . . 8 from FIG. 5, the devices 1 . . . N can transmit an announce message that indicates SSID="Lamp". The bootstrapping interface has an associated interface type (e.g., WiFi, Bluetooth, infrared (IR), LTE Direct, WiFi Direct, etc.) and is distinct from the secure local interface, although it is possible that the bootstrapping interface and the secure local interface share the same interface type. For example, the secure local interface can be implemented as WiFi with a particular form of encryption, whereas the bootstrapping interface can correspond to unencrypted WiFi. Thus, while the secure local interface and the bootstrapping interface are both "WiFi" in this example, it will be appreciated that the mere ability to communicate via WiFi does not permit devices to join the secure local network without knowledge of the encryption being used thereon. Alternatively, the interface types of the secure local interface and the bootstrapping interface can simply be different (e.g., the secure local network can use WiFi whereas the bootstrapping interface can use IR, Bluetooth, LTE Direct, WiFi Direct, etc.)

The control device detects devices 1 . . . N based on the announcements from 705 and 710, 715. In an example, the discovery procedure shown between 705-715 can be triggered by the control device broadcasting a discovery request in conjunction with a scan of the bootstrapping interface, whereby devices in proximity to the control device that are not yet part of the secure local network are expected to receive the discovery request and then announce their presence over the bootstrapping interface. Alternatively, the devices 1 . . . N can transmit the announcements 705 and 710 on a periodic basis over the bootstrapping interface, so the control device merely needs to start scanning for nearby devices without broadcasting the discovery request.

At this point, assume that the operator of the control device wishes to on-board a particular target device to the secure local network. Under this assumption, at 720, the control device obtains a selection of device 1 for on-boarding. As will be appreciated, device 1 does not necessarily correspond to the particular target device that the control device wishes to on-board to the secure local network, so the correlation (or lack thereof) between device 1 and the particular target device that the control device wishes to on-board to the secure local network must be verified, as will be described below in more detail.

The selection of 720 can occur in a variety of ways. For example, the operator of the control device can be presented with a list of discovered device as in FIG. 6, from which the operator can input a selection of a device for an on-boarding attempt (e.g., by clicking on a particular IoT Lamp indicator). Alternatively, the operator of the control device can select a type of device that is desired to be on-boarded (e.g., lamp, television, dishwasher, etc.). The control device can then select a given device with the selected device type via a selection rule (e.g., a device that is not yet on-boarded with the selected device type having the highest associated signal strength over the bootstrapping interface, a random selection, a next device in a given sequence of devices determined by the control device based on selection criteria such as signal strength, etc.). After obtaining the selection of 720, the selected device for the on-boarding attempt is not simply on-boarded. Rather, as will be described below in more detail, the selected device first undergoes an authentication procedure by which the operator attempts to verify whether the selected device does, in fact, correspond to the physical device that the operator is trying to on-board to the secure local network.

At 725, the control device establishes a bootstrap connection to device 1 via the bootstrapping interface, 725, and then delivers a message to device 1 over the bootstrap connection that requests the selected device to activate an observable function that is configured to be observable to one or more observation entities from a set of observation entities separate from the control device and in proximity to the selected device, 730.

The observable function that is instructed to be activated via the message of 730 can be implemented in a variety of ways. For example, the observable function can be a human-detectable indicator such as a visible indicator (e.g., a light or light sequence, etc.), an audible indicator (e.g., a beeping sound or other recognizable audio signature, etc.), a thermal indicator (e.g., heat, cold, etc.) or a mechanical indicator (e.g., vibration, movement, etc.). In these examples, the observable function is expected to be capable of direct observation by a human (e.g., by the human's ears, nose, eyes, etc.), specifically, the operator of the control device, which permits the operator of the control device to personally verify that the device to be on-boarded is the correct device. So, if the operator is attempting to on-board his/her desk lamp to the secure local network, the desk lamp can emit a beep in an example. If the operator hears the beep, the operator can authorize on-boarding for the selected device. However, if the operator hears some other lamp emit the beep or a lamp that is outside of the range of the operator's hearing emits the beep, the operator will not authorize on-boarding for the selected device because the operator will realize that the selected device is not the correct device for on-boarding.

In another example, the observable function can be a machine-detectable indicator that is not directly detectable by a human, such as an ultrasound, a short-range wireless signal, an infrared (IR) or ultraviolet emission, a thermal indicator that modifies heat and/or cold by less than a human detection threshold, a mechanical indicator (e.g., vibration, movement, etc., that is less than a human detection threshold).

In the case where the observable function is a human-detectable indicator, the set of observation entities can include the operator of the control device him/herself. However, the set of observation entities could also include one or more machines that are configured to assist the operator of the control device to detect the observable function. For example, in an example whereby the observable function is a beeping noise, the operator of the control device could listen for the beeping noise while the operator is holding a noise detector device (e.g., a microphone, etc.) that independently searches for the beeping noise. In the case where the observable function is be a machine-detectable indicator that is not directly detectable by a human, the set of observation entities can include the one or more machines configured to assist the operator of the control device to detect the observable function without the operator him/herself being included among the set of observation entities. In any case, the set of observation entities are generally considered to be separate from the control device itself.

Referring to FIG. 7, device 1 activates the observable function at 735, and the set of observation entities monitor for the observable function, 740. At 745, the control device determines whether the operator of the control device verifies that the observable function has been successfully detected as being performed by the particular target device for which on-boarding is desired. For example, the control device can present a prompt that asks the operator to verify whether or not the observable function was successfully detected as being performed by the particular target device for which on-boarding is desired.

If the operator does not verify that the observable function has been successfully detected (e.g., either by the operator him/herself or with the assistance of one or more machines) as being performed by the particular target device for which on-boarding is desired, the control device does not authorize device 1 to access the secure local network and is not on-boarded, 750. At this point, while not shown explicitly in FIG. 7, the process can return to 720 whereby a different device is selected for the on-boarding attempt, either by manual operator selection or in accordance with a device sequence. For example, to on-board a target IoT Lamp to the secure local network, the control device can define a sequence by which each of the eight IoT Lamps from FIG. 5 activate the observable function at separate times (e.g., one after the other, in order, for 5 seconds each). The particular target IoT Lamp for which on-boarding is desired can then correspond to the IoT Lamp that is performing the observable function when the operator provides the verification at 745, while any other IoT Lamps remain unverified.

Referring to FIG. 7, if the operator verifies that the observable function has been successfully detected as being performed by the particular target device for which on-boarding is desired, the control device authorizes device 1 to access the secure local network, 755. Once authorized, the control device on-boards device 1 to the secure local network by transmitting a set of network credentials (e.g., a password, encryption information, frequency and/or channel information of an IoT communications interface upon which the IoT network operates, etc.) by which device 1 can join the secure local network to device 1 over the bootstrapping interface, 760, after which device 1 accesses the secure local network using the set of network credentials over the secure network interface, 765.

Figure 8:
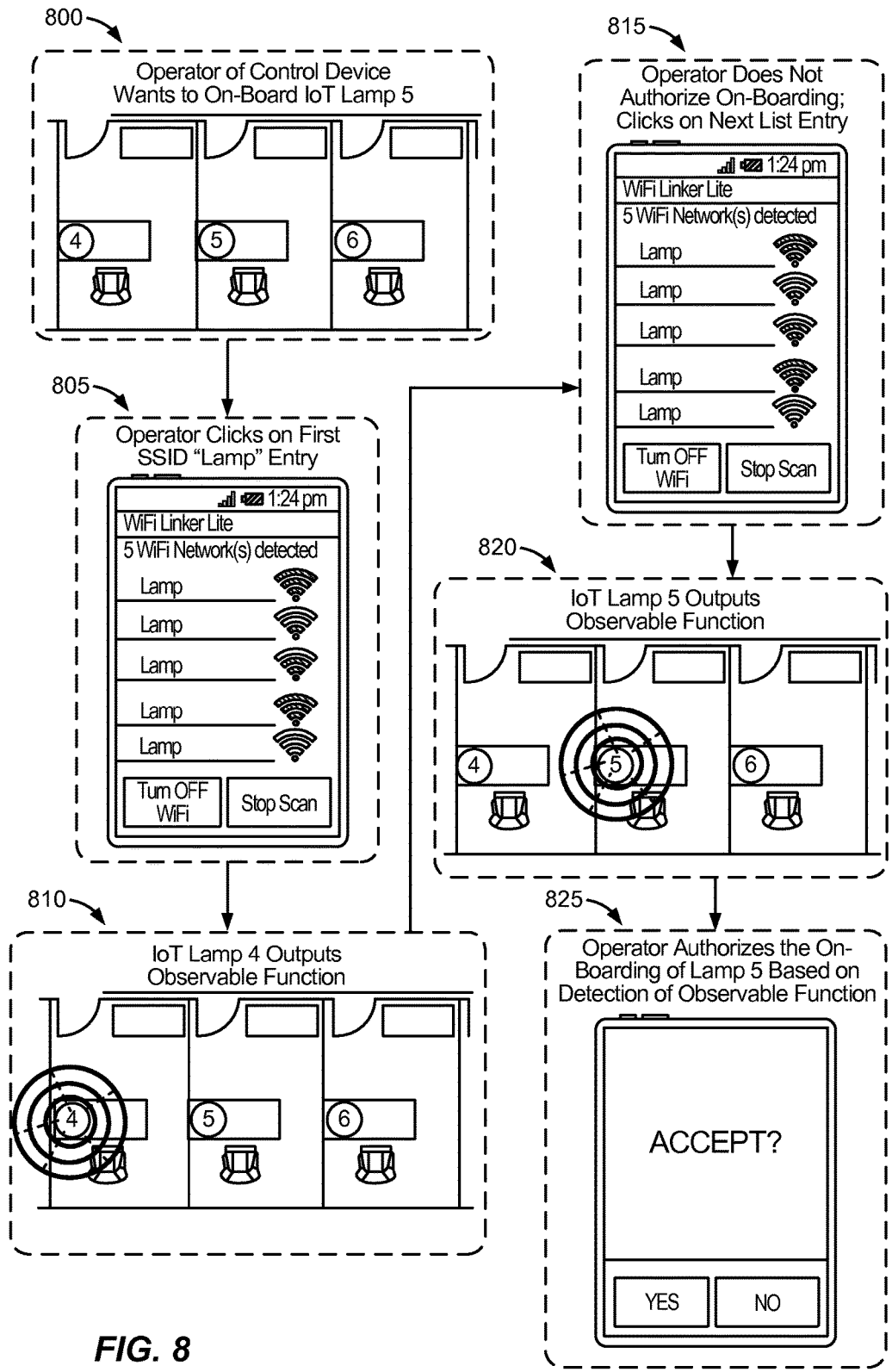
FIG. 8 illustrates a more detailed implementation of the process of FIG. 7 implemented in the IoT environment of FIG. 5 in accordance with an embodiment of the disclosure.

FIG. 8 illustrates a more detailed implementation of the process of FIG. 7 implemented in the IoT environment 500 of FIG. 5 in accordance with an embodiment of the disclosure. Referring to FIG. 8, assume that the operator of the control device wants to on-board IoT Lamp 5 from FIG. 5 within office 525 to the IoT network, 800. For example, the operator may be an Information Technology (IT) administrator that is installing a new lamp into an office and wants the new lamp to comply with an energy saving control scheme, which requires the new lamp to be on-boarded to the IoT network. The operator positions him/herself in proximity to IoT Lamp 5 within office 525 and then clicks on a first SSID "Lamp" entry (e.g., a top-listed SSID "Lamp" entry) on a selection screen of the control device as a result of a discovery procedure, 805 (e.g., similar to 705-720 of FIG. 7). However, assume that the first-selected SSID "Lamp" entry actually corresponds to IoT Lamp 4 instead of IoT Lamp 5, 810 (e.g., similar to 725-750 of FIG. 7). The operator does not verify the first SSID "Lamp" entry as corresponding to IoT Lamp 5, and instead the operator clicks on a next SSID "Lamp" entry (e.g., a second-from-the-top SSID "Lamp" entry, etc.) on the selection screen of the control device, 815 (e.g., similar to 705-720 of FIG. 7). Assume that the second-selected SSID "Lamp" entry corresponds to IoT Lamp 5, 820 (e.g., similar to 725-740 of FIG. 7). The operator verifies that the second-selected SSID "Lamp" entry corresponds to IoT Lamp 5, after which IoT Lamp 5 is on-boarded by the control device, 825 (e.g., similar to 745 and 755-765 of FIG. 7).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a control device that is configured to selectively on-board a target device to a secure local network, comprising:
   discovering a set of devices over a bootstrapping interface;
   establishing a bootstrap connection to at least one device from the set of devices in response to the discovery without authorizing the at least one device to access the secure local network;
   instructing the at least one device via the bootstrap connection to activate an observable function that is configured to be observable to one or more observation entities that are separate from the control device and are in proximity to the at least one device;
   determining whether an operator of the control device verifies that the observable function has been successfully detected as performed by the target device; and
   selectively authorizing the at least one device to access the secure local network based on the determination,
   wherein the one or more observation entities include the operator of the control device, one or more machines configured to assist the operator of the control device to detect the observable function or a combination thereof, and
   wherein the observable function includes emission of a human-detectable indicator that is configured to be detectable to the operator of the control device, a machine-detectable indicator that is configured to be detectable by the one or more machines while not being directly detectable to the operator of the control device, or a combination thereof.

2. The method of claim 1,
   wherein the bootstrapping interface comprises WiFi, Bluetooth, or infrared (IR), and
   wherein the secure local network is a WiFi network.

3. The method of claim 1, wherein the observable function outputs one or more of a visible indicator, an audible indicator, an ultrasound, a short range wireless signal, a non-visible indicator, an infrared indicator, an ultraviolet indicator, a thermal indicator or mechanical indicator, a vibration, a movement or any combination thereof.

4. The method of claim 1,
   wherein the operator of the control device verifies that the observable function has been successfully detected as performed by the target device, and
   wherein the selectively authorizing authorizes the at least one device to access the secure local network in response to the determination.

5. The method of claim 4, further comprising:
   transmitting a set of network credentials to the at least one device that is configured to be used by the at least one device for accessing the secure local network.

6. The method of claim 1,
   wherein the operator of the control device does not verify that the observable function has been successfully detected as performed by the target device, and
   wherein the selectively authorizing does not authorize the at least one device to access the secure local network in response to the determination.

7. The method of claim 1,
   wherein the secure local network is an Internet of Things (IoT) network, and
   wherein the target device is an IoT device.

8. The method of claim 1, wherein the one or more observation entities include the operator of the control device.

9. The method of claim 8, wherein the observable function includes emission of the human-detectable indicator that is configured to be detectable to the operator of the control device.

10. A method of attempting to on-board a device to a secure local network, comprising:
    establishing a bootstrap connection to a control device of the secure local network without obtaining authorization to access the secure local network;
    receiving an instruction via the bootstrap connection to activate an observable function that is configured to be observable to one or more observation entities in proximity to the device;
    activating the observable function in response to the instruction; and
    selectively obtaining authorization to access the secure local network based on whether an operator of the control device successfully detects the observable function performed by the device and verifies the observable function as being performed by a target device for which on-boarding is desired,
wherein the one or more observation entities include the operator of the control device, one or more machines configured to assist the operator of the control device to detect the observable function or a combination thereof, and
wherein the observable function includes emission of a human-detectable indicator that is configured to be detectable to the operator of the control device, a machine-detectable indicator that is configured to be detectable by the one or more machines while not being directly detectable to the operator of the control device, or a combination thereof.

11. The method of claim 10,
wherein the bootstrap connection comprises over a bootstrapping interface that is WiFi, Bluetooth, or infrared (IR), and
wherein the secure local network is a WiFi network.

12. The method of claim 10, further comprising:
if the selectively obtaining authorization obtains the authorization to access the secure local network, receiving a set of network credentials from the control device that is configured to be used by the device for accessing the secure local network.

13. The method of claim 10,
wherein the secure local network is an Internet of Things (IoT) network, and
wherein the target device is an IoT device.

14. The method of claim 10, wherein the one or more observation entities include the operator of the control device.

15. The method of claim 10, wherein the observable function includes emission of the human-detectable indicator that is configured to be detectable to the operator of the control device.

16. A control device that is configured to selectively on-board a target device to a secure local network, comprising:
a hardware processor coupled to a transceiver and configured to:
discover a set of devices over a bootstrapping interface;
establish a bootstrap connection to at least one device from the set of devices in response to the discovery without authorizing the at least one device to access the secure local network;
instruct the at least one device via the bootstrap connection to activate an observable function that is configured to be observable to one or more observation entities that are separate from the control device and are in proximity to the at least one device;
determine whether an operator of the control device verifies that the observable function has been successfully detected as performed by the target device; and
selectively authorize the at least one device to access the secure local network based on the determination,
wherein the one or more observation entities include the operator of the control device, one or more machines configured to assist the operator of the control device to detect the observable function or a combination thereof, and
wherein the observable function includes emission of a human-detectable indicator that is configured to be detectable to the operator of the control device, a machine-detectable indicator that is configured to be detectable by the one or more machines while not being directly detectable to the operator of the control device, or a combination thereof.

17. The control device of claim 16,
wherein the bootstrapping interface is WiFi, Bluetooth, or infrared (IR), and
wherein the secure local network is a WiFi network.

18. The control device of claim 16, wherein the observable function outputs one or more of a visible indicator, an audible indicator, an ultrasound, a short range wireless signal, a non-visible indicator, an infrared indicator, an ultraviolet indicator, a thermal indicator or mechanical indicator, a vibration, a movement or any combination thereof.

19. The control device of claim 16,
wherein the operator of the control device verifies that the observable function has been successfully detected as performed by the target device, and
wherein the selectively authorizing authorizes the at least one device to access the secure local network in response to the determination.

20. The control device of claim 16, wherein the hardware processor is further configured to:
transmit a set of network credentials to the at least one device that is configured to be used by the at least one device for accessing the secure local network.

21. The control device of claim 16,
wherein the operator of the control device does not verify that the observable function has been successfully detected as performed by the target device, and
wherein the selectively authorizing does not authorize the at least one device to access the secure local network in response to the determination.

22. A device configured to attempt to on-board onto a secure local network, comprising:
a hardware processor coupled to a transceiver and configured to:
establish a bootstrap connection to a control device of the secure local network without obtaining authorization to access the secure local network;
receive an instruction via the bootstrap connection to activate an observable function that is configured to be observable to one or more observation entities in proximity to the device;
activate the observable function in response to the instruction; and
selectively obtain authorization to access the secure local network based on whether an operator of the control device successfully detects the observable function performed by the device and verifies the observable function as being performed by a target device for which on-boarding is desired,
wherein the one or more observation entities include the operator of the control device, one or more machines configured to assist the operator of the control device to detect the observable function or a combination thereof, and
wherein the observable function includes emission of a human-detectable indicator that is configured to be detectable to the operator of the control device, a machine-detectable indicator that is configured to be detectable by the one or more machines while not being directly detectable to the operator of the control device, or a combination thereof.

23. The device of claim 22,
wherein the bootstrap connection is established over a bootstrapping interface that is WiFi, Bluetooth, or infrared (IR), and
wherein the secure local network is a WiFi network.

24. The device of claim 22, wherein the hardware processor is further configured to:
if the selectively obtaining authorization obtains the authorization to access the secure local network, receive a set of network credentials from the control device that is configured to be used by the device for accessing the secure local network.

* * * * *